US011896177B2

(12) United States Patent
Huffman et al.

(10) Patent No.: US 11,896,177 B2
(45) Date of Patent: Feb. 13, 2024

(54) EXTRACTION WITH TEMPORARY SUCTION INTERRUPT

(71) Applicant: BISSELL Inc., Grand Rapids, MI (US)

(72) Inventors: Eric C. Huffman, Lowell, MI (US); Charles A. Reed, Jr., Rockford, MI (US)

(73) Assignee: BISSELL Inc., Grand Rapids, MI (US)

( * ) Notice: Subject to any disclaimer, the term of this patent is extended or adjusted under 35 U.S.C. 154(b) by 0 days.

(21) Appl. No.: 17/982,414

(22) Filed: Nov. 7, 2022

(65) Prior Publication Data

US 2023/0058233 A1 Feb. 23, 2023

Related U.S. Application Data

(60) Division of application No. 17/091,750, filed on Nov. 6, 2020, now Pat. No. 11,497,370, which is a continuation of application No. 16/175,105, filed on Oct. 30, 2018, now Pat. No. 10,827,900, which is a continuation of application No. 15/228,303, filed on Aug. 4, 2016, now Pat. No. 10,178,934, which is a continuation of application No. 13/775,834, filed on Feb. 25, 2013, now Pat. No. 9,409,213, which is a division of application No. 12/574,108, filed on Oct. 6, 2009, now Pat. No. 8,381,352.

(51) Int. Cl.

| | |
|---|---|
| ***A47L 11/40*** | (2006.01) |
| ***A47L 11/34*** | (2006.01) |
| ***B08B 5/04*** | (2006.01) |
| ***A47L 11/30*** | (2006.01) |

(52) U.S. Cl.

CPC ........... *A47L 11/4011* (2013.01); *A47L 11/30* (2013.01); *A47L 11/34* (2013.01); *A47L 11/40* (2013.01); *A47L 11/4008* (2013.01); *A47L 11/4016* (2013.01); *A47L 11/4044* (2013.01); *A47L 11/4083* (2013.01); *A47L 11/4088* (2013.01); *B08B 5/04* (2013.01)

(58) Field of Classification Search

None

See application file for complete search history.

(56) References Cited

U.S. PATENT DOCUMENTS

2003/0024065 A1* 2/2003 Zahuranec ............ A47L 7/0042 15/320
2007/0209152 A1* 9/2007 Pullins .................... A47L 9/325 15/410
2007/0226943 A1* 10/2007 Lenkiewicz ........ A47L 11/4083 15/320

* cited by examiner

*Primary Examiner* — Eric W Golightly

(74) *Attorney, Agent, or Firm* — Quinn IP Law

(57) ABSTRACT

An extractor includes a fluid recovery system including a suction nozzle, a recovery tank assembly, and a suction source having an inlet fluidly connected to the recovery tank assembly and the suction nozzle through an air conduit and adapted to draw liquid through the suction nozzle and deposit the liquid in the recovery tank assembly. The extractor includes a body provided with the air conduit for movement between a first position wherein suction is unreduced and a second position wherein suction is reduced. The extractor includes a fluid delivery system including a solution supply tank assembly, a fluid distributor, and a conduit for depositing fluid onto a surface. The extractor includes a hydraulic connector operably coupled to the body and adapted to move the body between the first and second positions.

15 Claims, 9 Drawing Sheets

EXTRACTION WITH TEMPORARY SUCTION INTERRUPT

CROSS-REFERENCE TO RELATED APPLICATIONS

This application is a divisional of U.S. patent application Ser. No. 17/091,750, now U.S. Pat. No. 11,497,370, issued Nov. 15, 2022, which is a continuation of U.S. patent application Ser. No. 16/175,105, filed Oct. 30, 2018, now U.S. Pat. No. 10,827,900, issued Nov. 10, 2020, which is a continuation of U.S. patent application Ser. No. 15/228,303, filed Aug. 4, 2016, now U.S. Pat. No. 10,178,934, issued Jan. 15, 2019, which is a continuation of U.S. patent application Ser. No. 13/775,834, filed Feb. 25, 2013, now U.S. Pat. No. 9,409,213, issued Aug. 9, 2016, which is a divisional of U.S. patent application Ser. No. 12/574,108, filed Oct. 6, 2009, now U.S. Pat. No. 8,381,352, issued Feb. 26, 2013, all of which are incorporated herein by reference in their entirety.

BACKGROUND

Extractors are well-known devices for deep cleaning carpets and other fabric surfaces, such as upholstery. Most carpet extractors comprise a fluid delivery system and a fluid recovery system. The fluid delivery system typically includes one or more fluid supply tanks for storing a supply of cleaning fluid, a fluid distributor for applying the cleaning fluid to the surface to be cleaned, and a fluid supply conduit for delivering the cleaning fluid from the fluid supply tank to the fluid distributor. The fluid recovery system typically comprises a recovery tank, a nozzle adjacent the surface to be cleaned and in fluid communication with the recovery tank through a working air conduit, and a suction source in fluid communication with the working air conduit to draw the cleaning fluid from the surface to be cleaned and through the nozzle and the working air conduit to the recovery tank. Examples of extractors are disclosed in commonly assigned U.S. Pat. No. 6,131,237 to Kasper et al. and U.S. Pat. No. 6,658,692 to Lenkiewicz, which are incorporated herein by reference in their entirety. Vacuum cleaners are also well-known cleaning devices for cleaning a range of items including carpets and drapery. Historically vacuums included a suction-relief vent for reducing the suction power to a suction nozzle.

U.S. Pat. No. 6,662,402 to Giddings et al. discloses a soil transfer extraction cleaning method employing a roller assembly including a soil transfer cleaning medium to mechanically remove soil from the surface to be cleaned. The method includes the steps of successively and repeatedly wetting a portion of the cleaning medium with a cleaning liquid, extracting any soil and at least some of the cleaning liquid from the previously wetted portion of the cleaning medium, and wiping the surface to be cleaned with the cleaning medium so as to transfer soil from the surface to be cleaned to the cleaning medium.

U.S. Pat. No. 6,735,812 to Hekman et al. discloses an apparatus having a cleaning implement in selective wiping contact with the surface to be cleaned; a cleaning solution dispenser that selectively wets a portion of the cleaning implement, a portion of the surface to be cleaned, or both; a first selectively controllable vacuum extractor tool to remove some of the dispensed cleaning solution and soil from the cleaning implement; and a second selectively controllable vacuum extractor tool which removes soil and some of the cleaning solution directly from the surface to be cleaned.

Traditionally, carpet extractors deliver cleaning fluid directly to a surface to be cleaned or onto an agitation system that subsequently delivers the cleaning solution to the surface to be cleaned. In both cases, the surface to be cleaned is saturated with cleaning fluid and allowed to dwell a sufficient amount of time in order to maximize the efficiency of the chemical process. In a second step, the cleaning solution together with any entrained debris is removed from the surface to be cleaned and collected via the fluid recovery system. In some cases it is desirable to increase the dwell time for portions of a carpet that are especially soiled.

BRIEF DESCRIPTION

An aspect of the present disclosure includes an extractor, including a fluid recovery system including a floor suction nozzle, a recovery tank assembly, a suction source having a suction inlet fluidly connected to the recovery tank and the suction nozzle through a working air conduit and adapted to draw liquid through the suction nozzle and deposit the liquid in the recovery tank, and having a suction source outlet, a body provided with the working air conduit for movement between a first position at which normal suction at the suction nozzle is unreduced and a second position at which normal suction at the suction nozzle is reduced, a fluid delivery system including a solution supply tank assembly, a fluid distributor, and a conduit between the solution supply tank assembly and the fluid distributor for depositing fluid onto a surface to be cleaned, a hydraulic connector operably coupled to the body and adapted to move the body between the first position and the second position, the hydraulic connector fluidly coupled to the fluid delivery system and adapted to move the body to the second position when fluid is provided from the solution supply tank assembly to the fluid distributor.

Another aspect of the present disclosure includes extractor, including a fluid delivery system including a solution supply tank assembly, a fluid distributor, and a conduit between the solution supply tank assembly and the fluid distributor for depositing fluid onto a surface to be cleaned, a fluid recovery system including a floor suction nozzle, a recovery tank assembly, a suction source having a suction inlet fluidly connected to the recovery tank and the suction nozzle through a working air conduit and adapted to draw liquid through the suction nozzle and deposit the liquid in the recovery tank, and having a suction source outlet, a leak hole in the working air conduit, and at least one moveable body provided with the leak hole, the at least one moveable body operable between a closed position wherein the leak hole is at least partially sealed and an opened position wherein the leak hole includes an open area and the working airflow at the suction nozzle is reduced.

DETAILED DESCRIPTION

Figure 1:
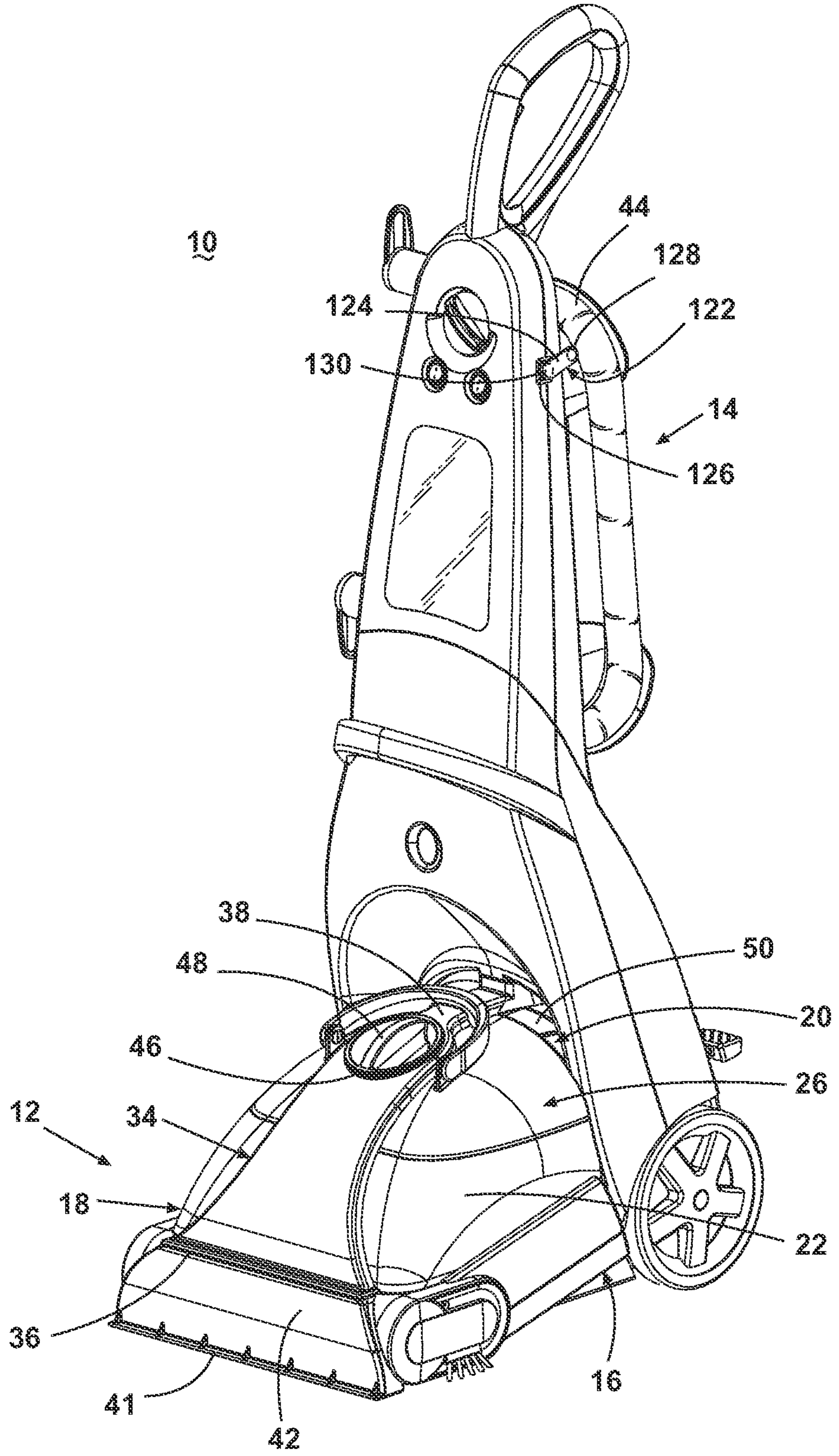
FIG. 1 is a front perspective view of a typical upright extractor used by the method according to the present disclosure.
Figure 2:
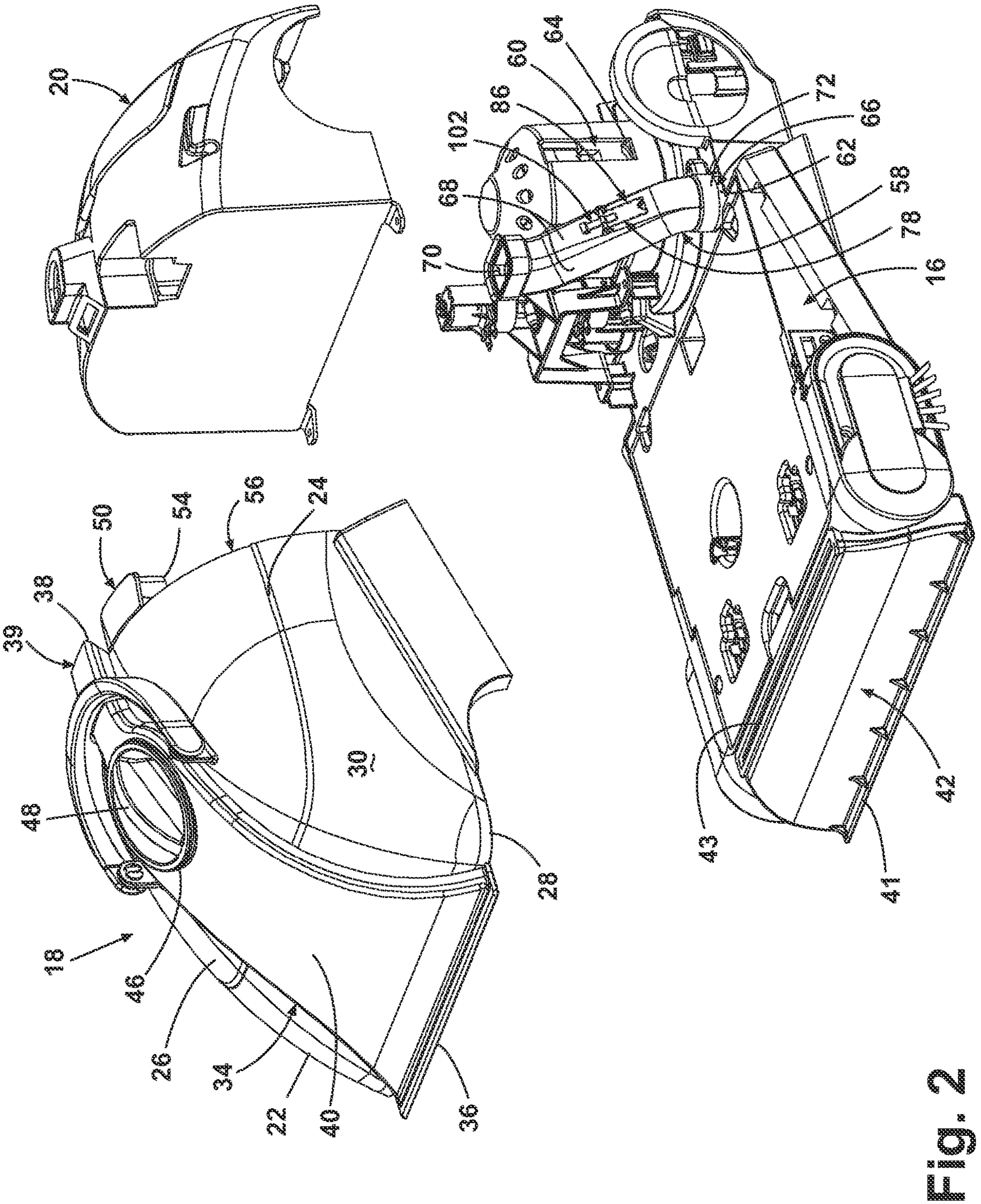
FIG. 2 is a partial exploded perspective view of a foot assembly of the upright extractor of FIG. 1.

Referring to the figures, and particularly to FIGS. 1-2, an upright extractor 10 according to the present disclosure includes a housing having a foot assembly 12 for movement across a surface to be cleaned and a handle assembly 14 pivotally mounted to the rear of the foot assembly 12 for directing the foot assembly 12 across the cleaning surface. The upright extractor 10 includes a fluid supply system for storing a cleaning fluid and delivering the cleaning fluid to the cleaning surface and a fluid recovery system for removing the spent cleaning fluid and dirt. The fluid supply system includes a solution supply tank assembly 20, a fluid distributor (not shown), and a conduit (not shown) between the solution supply tank assembly 20 and the fluid distributor for depositing fluid onto a surface to be cleaned. The fluid recovery system includes a floor suction nozzle 42, a recovery tank assembly 18, a working air conduit between the suction nozzle 42 and the recovery tank assembly 18, and a motor and fan assembly 60 that acts as a suction source. The working air conduit includes a tank outlet conduit 50 leading from the internal tank volume and leads to a motor duct 58, which is in fluid communication with the motor and fan assembly 60. The upright extractor 10 also includes an agitation system for agitating the surface to be cleaned. The components of the fluid delivery system and the fluid recovery system are supported by at least one of the foot assembly 12 and the handle assembly 14. Examples of extractors having fluid delivery, fluid recovery, and agitation systems are disclosed in commonly assigned U.S. Pat. No. 6,131,237 to Kasper et al. and U.S. patent application Ser. No. 11/276,167 to Lenkiewicz et al., now U.S. Pat. No. 7,784,148, which are both incorporated herein by reference in their entirety. While illustrated in an upright extractor, it is contemplated that the present disclosure can be used in any type of extractor including canister and handheld extractors.

The foot assembly 12 includes a base assembly 16 configured to support a recovery tank assembly 18 at a forward portion thereof and the solution supply tank assembly 20 at a rearward portion thereof. The solution supply tank assembly 20 is fluidly connected to a fluid distributor (not shown), and includes the necessary tubing, valves, pumps, heaters, and spray nozzles for distributing a cleaning fluid onto the surface to be cleaned. The base assembly 16 can also be configured to support a conventional motor-driven brush assembly for agitating the surface to be cleaned.

Referring to FIG. 2, the recovery tank assembly 18 includes a lower tank housing 22 with an open top 24 covered by a removable lid 26 and a closed bottom 28. A recovery chamber 30 is formed within the lower tank housing 22 and is fluidly connected to a recovery tank inlet (not shown) to receive and store spent cleaning fluid and dirt. The recovery tank assembly 18 includes a fluid conduit 34 overlying the removable lid 26 and fluidly connects a nozzle conduit inlet 36 originating at a forward nozzle conduit section 40 and an accessory conduit inlet 38 originating at a rearward accessory conduit section 39. When the recovery tank assembly 18 is installed onto the base assembly 16, the nozzle conduit section 40 is fluidly connected to an outlet 43 of a floor nozzle 42 having a nozzle inlet 41 adjacent to the cleaning surface, and the accessory conduit section 39 is in fluid communication with an upholstery hose 44 (FIG. 1). The nozzle conduit section 40 and the accessory conduit section 39 meet at a circular opening 46 formed in the fluid conduit 34. The circular opening 46 opens into the recovery chamber 30 and is in fluid communication with the recovery tank inlet (not shown). A diverter valve 48 is rotatably mounted within the circular opening 46 and selectively fluidly connects one of the nozzle conduit section 40 and the accessory conduit section 39 with the recovery chamber 30 via the recovery tank inlet (not shown). The diverter valve 48 can be manually rotated between an accessory cleaning mode and a floor cleaning mode wherein extracted fluid can be recovered via the floor nozzle 42 through the fluid conduit 34, or from the upholstery hose 44 through the accessory conduit 39 respectively.

A tank outlet conduit 50 has an inlet (not shown) and a downwardly-oriented outlet 54 and is mounted on a rear wall 56 of the lid 26. The tank outlet conduit 50 forms an airflow path from the internal tank volume to a motor duct 58, which is in fluid communication with the motor and fan assembly 60. The lid 26 can optionally include separator baffles (not shown) for separating fluid and debris from and working airflow and creating a torturous working airflow path that inhibits fluid ingestion into the motor and fan assembly 60.

Figure 3:
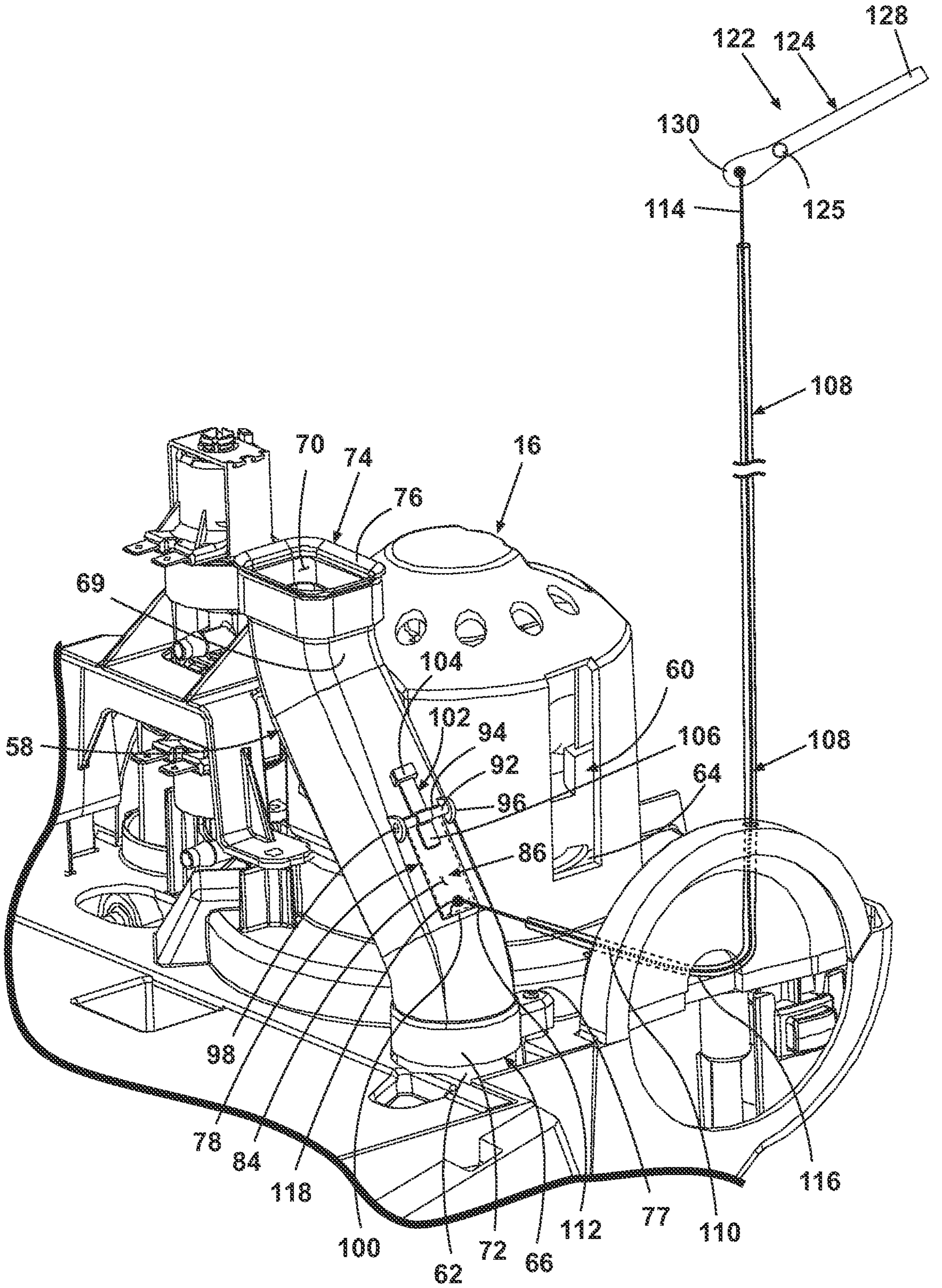
FIG. 3 is a partial perspective view of the foot assembly of FIG. 2 showing the duct door in a closed position.

Now referring to FIGS. 2-3, the base assembly 16 includes a fan assembly housing 64 extending upwardly from the bottom wall for supporting a vacuum source 60. A fan assembly inlet conduit 62 extends outwardly from the fan assembly housing 64 along the bottom wall and terminates at an inlet 66 for mounting the motor duct 58. Thus, the motor duct 58 fluidly connects the outlet 54 of the tank outlet conduit 50 to the motor and fan assembly 60 when the recovery tank assembly 18 is mounted to the base assembly 16. The motor duct 58 extends upwardly from the base assembly 16 and includes an elongate hollow member having four planar sides 68, an inlet 70, and a tubular outlet 72. A resilient seal 74 surrounds the inlet 70 and includes a flexible flange 76 that selectively mates with the tank outlet conduit 50. The motor duct outlet 72 is secured to the fan assembly inlet conduit 62 with a screw 77, but other mechanical fasteners are possible such as snaps, or the like. A ring seal (not shown) is compressed between the motor duct outlet 72 and the inlet 66 to ensure an airtight connection.

Figure 4:
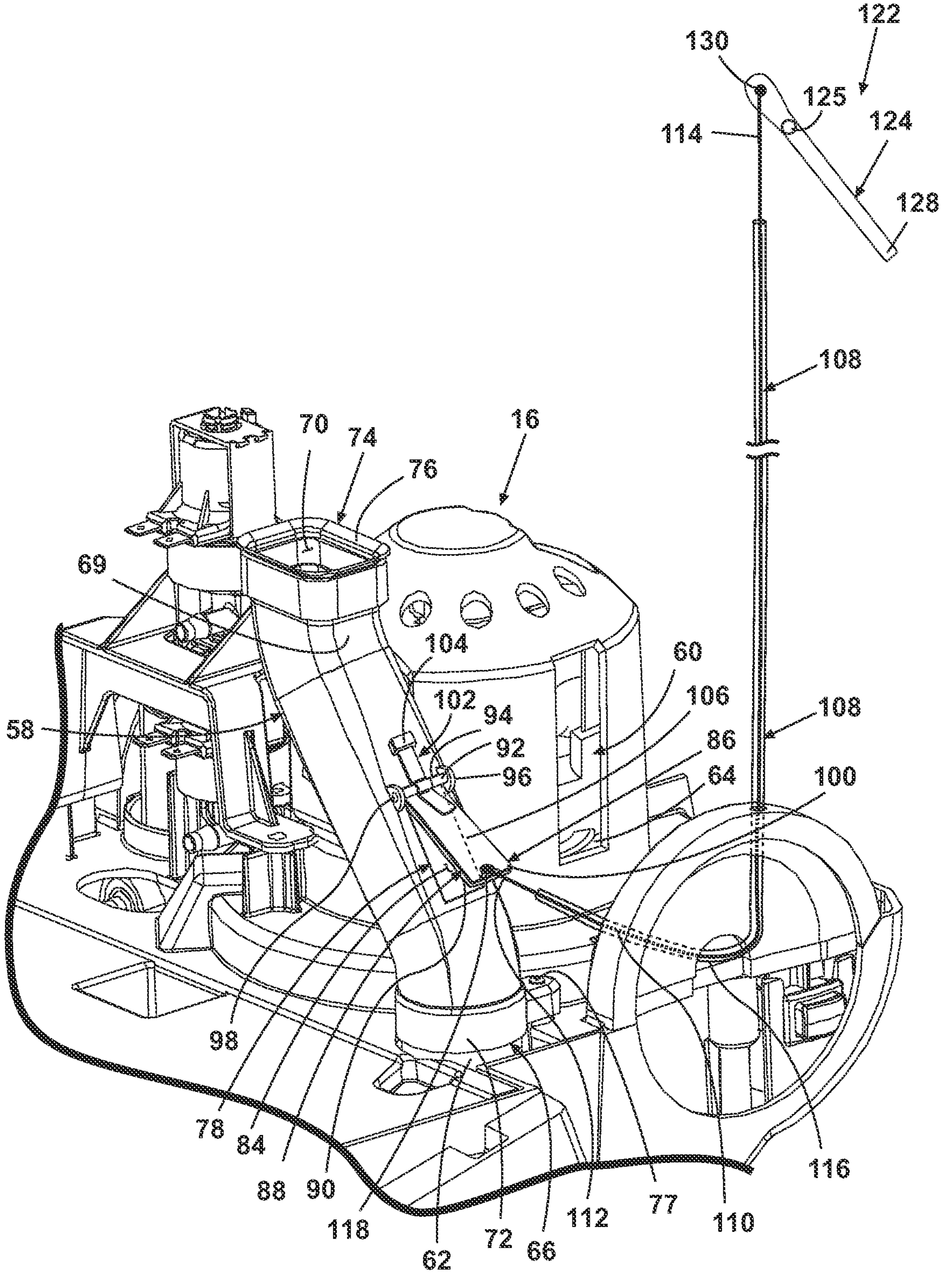
FIG. 4 is a partial perspective view of the foot assembly shown in FIG. 2 showing the duct door in an open position.

Now referring to FIGS. 3-4, the motor duct 58 further includes a leak hole 78 positioned along an outboard planar side 69. While the leak hole 78 has been illustrated as being located on the motor duct 58, it is contemplated that the leak hole can be positioned anywhere on the working air conduit. The leak hole 78 has been illustrated as having a generally rectangular shape, although other shapes are suitable, including circular, oval or the like. The leak hole 78 can also include a grill or perforated screen instead of an entirely open hole. The open area of the leak hole 78 is preferably sized proportionally to the motor duct inlet 70 area such that a substantial air leak is created when the leak hole 78 is open. For example, when the leak hole 78 is open, suction lift at the floor nozzle 42 is preferably reduced by at least 50%. The leak hole area 84 is preferably greater than or equal to the area of the motor duct inlet 70 in order to provide adequate suction leakage.

A pivotally mounted duct door 86 is configured to selectively open and close the leak hole 78. The duct door 86 includes a generally planar member with a sealing face 88 having a resilient seal 90 affixed along its perimeter for selectively sealing around the leak hole 78. Cylindrical bearing pins 92 extend outwardly along a rear edge 94 of the duct door 86 and are rotatably received within mounting ears 96 formed on the motor duct 58 on opposed sides of the leak hole 78. Each mounting ear 96 includes a bearing hole 98 sized to permit the bearing pins 92 to rotate freely therein. The duct door 86 can thus pivot between an "open" position (FIG. 4), where a free end 100 of the duct door 86 is spaced apart from the leak hole 78, and a "closed"position (FIG. 3), where the duct door 86 is shut thereby sealing the leak hole 78. While the duct door 86 has been illustrated as being pivotally mounted to the motor duct, alternate mounting configurations, such as a slidable mounting configuration, for example, are contemplated.

A leaf spring 102 includes a secured end 104 that is fastened to the motor duct 58 and an unsecured end 106 configured to bias the duct door 86 to the closed position. The secured end 104 can be fixed to the motor duct 58 via a commonly known fastening means such as a screw, snap, heat stake, adhesive, or other conventional fastening means. The unsecured end 106 is configured to press the duct door 86 into the "closed" position. Optionally, the spring can include alternate spring types such as a torsion or compression spring, or it can be omitted altogether.

The actuator 122 is connected through a mechanical connector to the duct door 86 for moving the duct door 86 between the open and closed positions. The mechanical connector can include a sheathed cable 108 that includes an internal cable 110 having a lower end 112 and upper end 114 slidably mounted within a cable jacket 116. The lower end 112 of the internal cable 110 is connected to a pin 118 on the free end 100 of the duct door 86. The sheathed cable 108 is routed through the base assembly 16 and the upright handle assembly 14 where the upper end 114 of the internal cable 110 is operably connected to an actuator 122. For simplicity, FIG. 3 and FIG. 4 include a schematic depiction of the actuator 122. The sheathed cable 108 can be fixed in place by commonly known cable management fasteners, screws, clips, snaps, ribs, bosses, or the like.

As shown in FIG. 1, the actuator 122 may include a lever 124 that is pivotally mounted within a mounting bracket 126 at the side of the upright handle assembly 14. The lever includes mounting pins 125 (FIG. 3) that are rotatably received within bearings (not shown) integral to the mounting bracket 126. A cantilever end 128 of the lever 124 extends outwardly from the mounting pins 125 and protrudes beyond the side of the upright handle 14 and is configured to be easily gripped by a user. A proximal end 130 extends inwardly from the mounting pins inside the handle and is operably connected to an upper end 114 of the internal cable 110. The lever 124 is selectively movable between "up" (FIG. 3) and "down" (FIG. 4) positions; "up" and "down" being designated with respect to upright handle 14 and corresponding to airflow through the leak hole 78 whereby when the lever 124 is in the "up"position, the duct door 86 is closed and when the lever 124 is in the "down" position, the duct door 86 is open. The mounting bracket 126 can optionally include conventional detent features for retaining the lever 124 in either the "up" or "down" position. Alternatively, an optional torsion spring (not shown) can be secured between the lever 124 and the mounting bracket 126, around the pins 125, to bias the lever 124 in the "up" position. In this configuration, the lever 124 can be pressed down momentarily and immediately returned to the "up" position when a user releases his or her grip on the lever 124.

Referring again to FIGS. 3-4, the proximal end 130 of the lever 124 is connected to the internal cable 110. The cable jacket 116 is retained within the base 16 and handle assembly 14, and remains stationary while the internal cable 110 is permitted to slide within the jacket 116 when it is pushed or pulled by the proximal end 130 of the lever 124. When the cantilever end 128 of the lever 124 is lifted to the "up" position as shown in FIG. 3, the mounting pins 125 rotate in the receiving bearings and the proximal end 130 moves downwardly in relation to the upright handle 14 and pushes the internal cable 110 within the jacket 116, thereby forcing the lower end 112 of the internal cable 110 to protrude out of the jacket 116. When the cantilever end 128 of the lever 124 is moved to the "down" position as shown in FIG. 4, the proximal end 130 rotates upwardly, thereby pulling the internal cable 110 and causing the lower end 112 of the internal cable 110 to retract inwardly within the cable jacket 116. Additional actuation design variations are contemplated such as substituting the pivoting lever 124 with a rotating dial or a sliding actuator.

In operation, the upright extractor 10 is prepared for use by filling the solution supply tank 20 with cleaning fluid. The upright extractor 10 is plugged into a power supply whereupon the vacuum motor and fan assembly 60 becomes energized and generates a vacuum force within the fluid recovery system. Cleaning fluid is selectively delivered to the cleaning surface via the fluid delivery system while the upright extractor 10 is moved forward and back across the cleaning surface. The agitation system is simultaneously energized to agitate the cleaning fluid into the surface to be cleaned. During normal cleaning mode, the vacuum force draws a working air flow in through the floor nozzle inlet 41, which is positioned adjacent to the cleaning surface. A working air mixture containing water, foam, cleaning solution, and dirt and debris flows through the fluid conduit 34 and recovery tank inlet (not shown), whereupon the fluid and debris are separated from the dry air and collected in the recovery chamber 30. Dry working air passes through the working air conduit and more specifically through the tank outlet 54 into the motor duct 58, and eventually into the motor and fan assembly 60, whereupon it is exhausted to atmosphere through vents (not shown) in the base assembly 16.

When extensively soiled areas are encountered, it is desirable to increase solution dwell time on the soiled surface to enhance cleaning effectiveness. A method of cleaning a surface includes, applying a cleaning solution to a surface, applying suction to the surface to remove the applied cleaning solution from the surface, and selectively interrupting the suction to the surface for a selected time to increase the dwell time of the cleaning solution on the surface. Increased solution dwell time and resulting improved cleaning performance can be accomplished by temporarily interrupting suction at the floor nozzle inlet 41 to increase the dwell time of the cleaning solution on the surface to be cleaned Restoring suction to the suction nozzle subsequent to the selected time removes the cleaning solution from the surface. The extractor 10 may continue to agitate and spray without the cleaning fluid being extracted through the floor nozzle 42 during the selected time of suction interruption. Alternatively, the extractor 10 may interrupt the agitation or application of the cleaning fluid during the selected time or suction interruption.

As shown in FIG. 4, a user can initiate this suction interrupt mode by gripping the cantilever end 128 of the lever 124 protruding from the side of the handle 14 and pushes it to the "down" position. This act selectively interrupts the suction by venting the suction between the recovery zone and the suction source or between the surface and the suction source. For example, as the mounting pins 125 of the lever 124 rotate on bearing surfaces in the mounting bracket 126, the proximal end 130 of the lever 124 rotates upwardly and pulls the upper end 114 of the internal cable 110, retracting the lower end 112 into the cable jacket 116. As the lower end 112 of the internal cable 110 retracts, it pulls the pin 118 and rotates the free end 100 of the duct door 86 away from the leak hole 78, thereby breaking the seal between the duct door 86 and the motor duct 58 and opening the leak hole 78. The open leak hole 78 creates a substantial suction vent within the fluid recovery system between the floor nozzle inlet 41 and the motor and fan assembly inlet (not shown). This suction vent effectively interrupts the suction at the floor nozzle inlet 41 and permits the cleaning solution to dwell on the cleaning surface instead of being extracted through the floor nozzle 42.

Upon treating the surface sufficiently, as shown in FIG. 3, a user restores suction to the suction nozzle by an act, such as lifting the cantilever end 128 of the lever 124, returning it to the "up" position. The proximal end 130 of the lever 124 rotates downwardly and pushes the upper end 114 of the internal cable 110 so the lower end 112 of the cable 110 extends out of the jacket 116. The lower end 112 of the cable 110 pushes on the pin 118 at the free end 100 of the duct door 86 and returns it to the closed position thus re-sealing the leak hole 78 and restoring full suction to the floor nozzle 42. The leaf spring 102 and negative pressure inside the motor duct 58 also tend to bias the duct door 86 back to its sealed/closed position.

Figure 5:
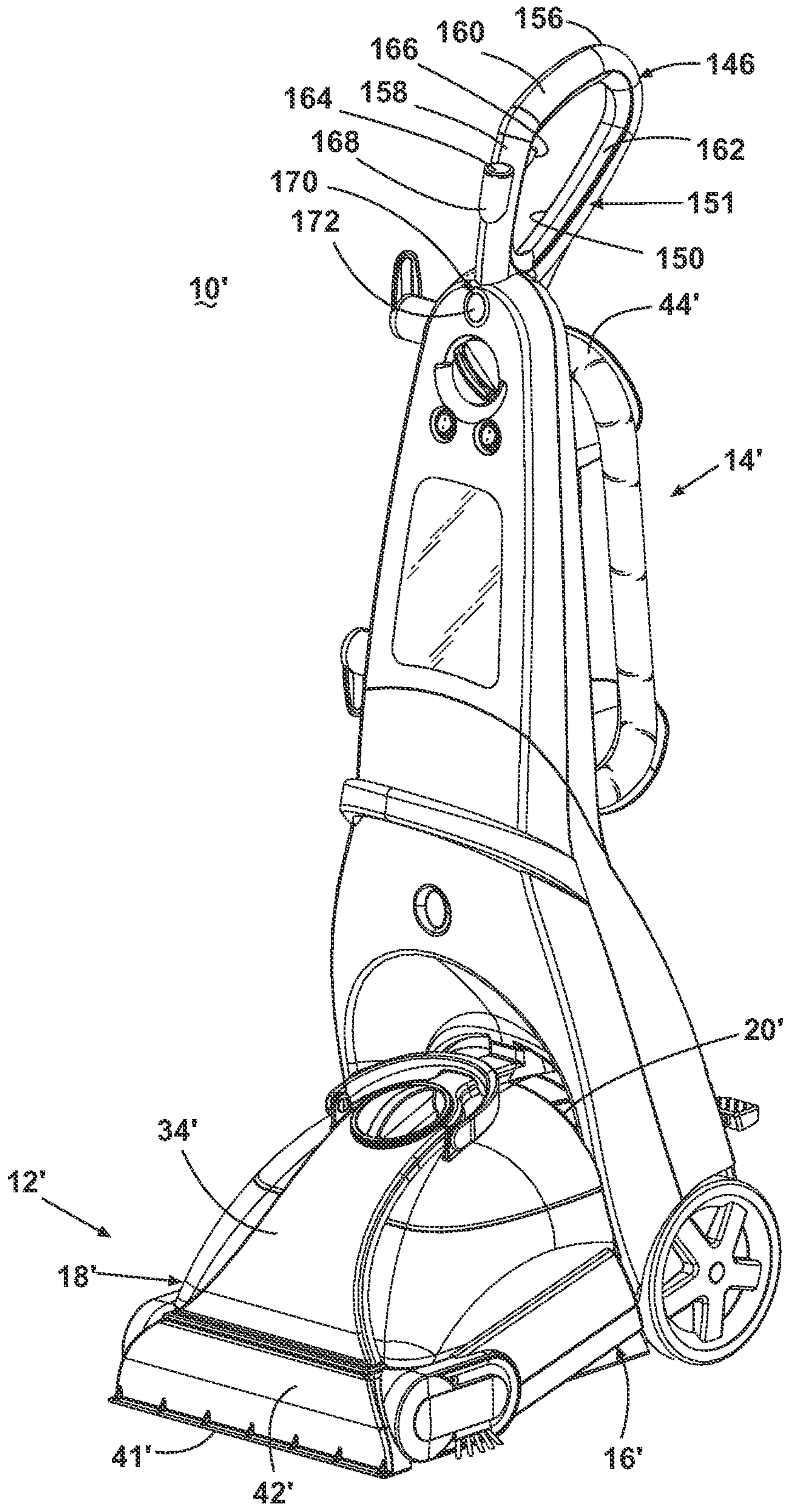
FIG. 5 is a front perspective view of an upright extractor according to a second aspect of the present disclosure.
Figure 6:
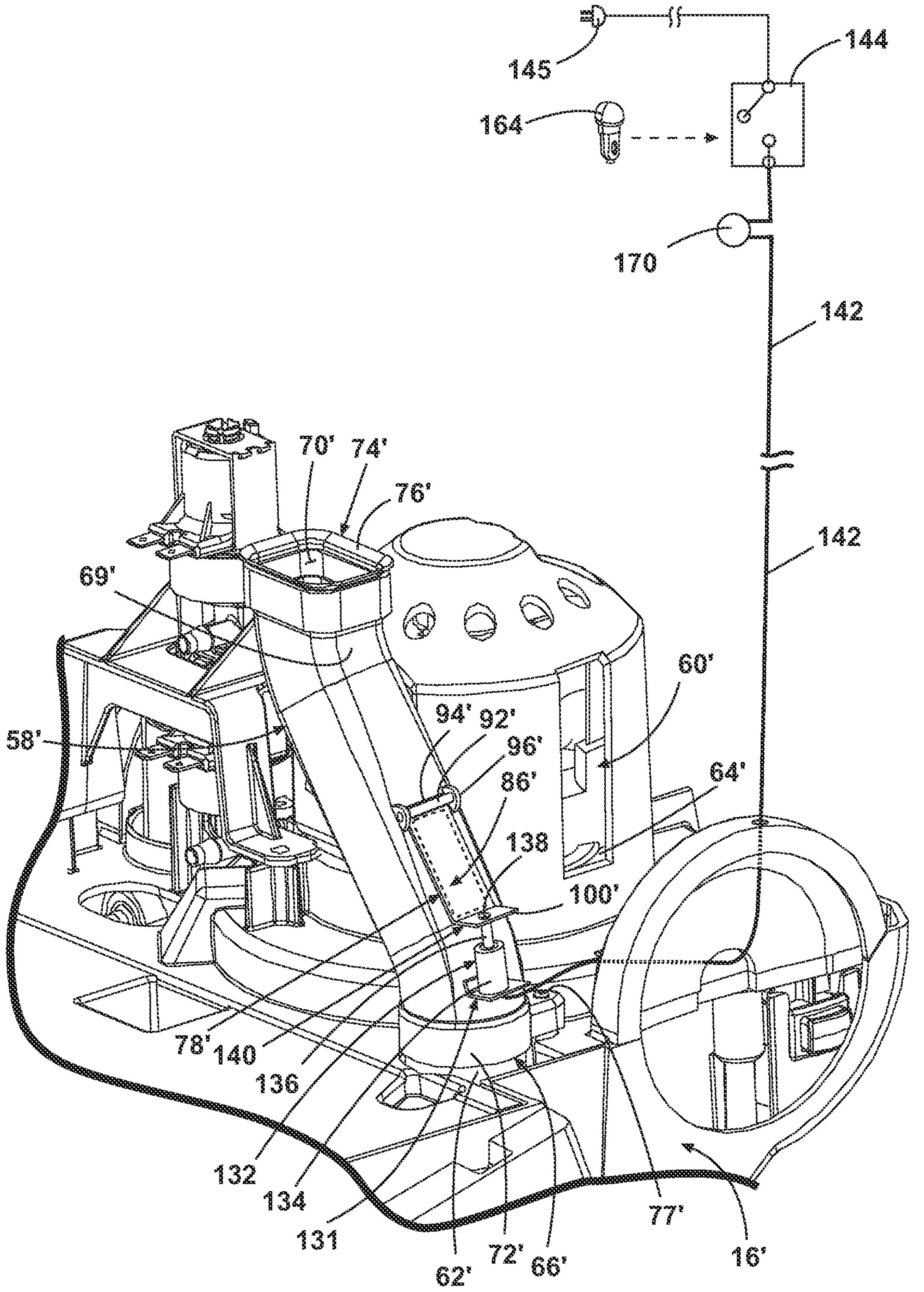
FIG. 6 is a partial perspective view of the foot assembly shown in FIG. 5 showing the duct door in a closed position.

Referring to FIGS. 5-6, in a second aspect of the present disclosure where like elements from the first example are identified with the same reference numerals and include a prime (') symbol, the actuator 122' is connected through an electrical connector to the duct door 86' for moving the duct door 86' between the open and closed positions. The electrical connector can include a small electromechanical solenoid piston 132 secured to a mating recess 131 formed in the lower portion of the motor duct 58'. The solenoid piston 132 is of conventional design and includes a stationary housing 134 having an inductive coil (not shown) mounted therein, connected to a power supply, and configured to surround a cylindrical piston 136. The solenoid piston 132 is selectively movable between a vertically extended position and a retracted position when the inductive coil is alternately energized and de-energized. A leading end 138 of the piston is operably connected to the bottom side of an angled flange 140 on the free end 100' of the duct door 86'. Electrical conductor leads 142 extend from the solenoid piston 132, routing through the base assembly 16', through the upright handle assembly 14', and are connected to a momentary micro-switch 144 housed in a cavity within an upright handle grip 146. The momentary micro-switch 144 is, in turn, connected to a line power source 145 to selectively energize the solenoid piston 132. Alternatively, the momentary micro-switch 144 can be replaced by a conventional toggle or "rocker" switch (not shown) as is commonly known in the art.

Referring to FIGS. 5-6, the handle grip 146 is mounted to an upper portion of the handle 14' and facilitates movement of the upright extractor 10' by the user across a surface to be cleaned. The grip 146 is formed by two mating halves 150, 151 and includes a stem (not shown) for mounting the grip 146 to the upper portion of the handle 14'. The grip 146 portion includes an enclosed loop that is generally triangular in shape having arcuate corners 156. The grip 146 portion is formed by a generally vertical, upright section 158 joined at an obtuse angle to one end of an upwardly and rearwardly extending hand section 160 and a connecting section 162 that connects an opposite end of the hand section to the upright section 158 at the stem (not shown). The handle grip 146 further includes electrical switches, such as a push button 164 and a trigger button 166, secured between the mating halves 150, 151. The push button 164 is slidably mounted within a pocket 168 formed on a front side of the upright section 158 for easy manipulation by a thumb of the user. A suitable push button and micro-switch configuration has been disclosed previously in published US 2008/0196193 A1, which is incorporated herein by reference in its entirety.

The push button 164 is operatively coupled to the momentary micro-switch 144 that is electrically coupled to the solenoid piston 132 via electrical leads 142 routed through the handle 14' and base assembly 16'. The trigger button 166 is positioned at a rear side of the upright section 158 for easy manipulation by a trigger finger of a user. The trigger 166 is operably connected to a second micro-switch (not shown) that is operably coupled to the fluid distributor (not shown) for distributing cleaning fluid onto the surface to be cleaned.

An optional visual indicator, such as an indicator light 170, is mounted to upper portion of the handle 14' for indicating when the suction at the floor nozzle 42' has been interrupted. The indicator light 170 can be selected from known constructions, including light emitting diodes (LED) or incandescent lamps, for example. The indicator light 170 is of conventional construction and includes a lens 172, a light emitting element (LED) (not shown), and electrical leads 142 connected in series with the momentary micro-switch 144 and solenoid piston 132.

As previously described, and shown in schematic form in FIG. 6, the momentary micro-switch 144 is operatively coupled to the push button 164 such that it becomes selectively engaged when a user slidably engages the push button 164. The indicator light 170 is preferably mounted to the upper portion of the handle 14' or the vertical, upright section 158 of the hand grip 146 such that the lens 172 is easily viewable by a user during use.

In operation, the upright extractor 10' is prepared for use as previously described and likewise functions in normal cleaning mode as previously described. When extensively soiled areas are encountered and a user desires to pre-treat a heavily soiled area by increasing solution dwell time, a user depresses the push button 164 with her thumb, which actuates the momentary micro-switch 144, allowing the user to selectively interrupt or restore suction to the suction nozzle by the electrical switch. The momentary micro-switch 144 closes the circuit containing the solenoid piston 132 and indicator light 170, thereby energizing both components simultaneously. When energized, the solenoid piston 132 extends and the leading end 138 of the cylindrical piston 136 pushes the angled flange 140 upwardly. The duct door 86' is pushed away from the leak hole 78' in the motor duct 58', thus creating a substantial suction vent within the fluid recovery system between the floor nozzle inlet 41' and the motor and fan assembly 60'. The suction vent effectively interrupts the suction at the floor nozzle inlet 41' and permits the cleaning solution to dwell on the cleaning surface instead of being extracted through the floor nozzle 42'. The indicator light 170 illuminates when the solenoid piston 132 becomes energized and indicates to the user that suction at the floor nozzle 42' has been interrupted. Upon treating the surface sufficiently, the user releases the push button 164, the momentary micro-switch 144 returns to its normally open position thereby opening the circuit and de-energizing both the solenoid piston 132 and indicator light 170. The solenoid piston 132 retracts to its compressed position and pulls the angled flange 140 downwardly returning the duct door 86' to its closed position thus sealing the leak hole 78' and restoring full suction to the floor nozzle 42'. The indicator light 170 simultaneously shuts off to indicate that suction to the floor nozzle 42' has been restored and that normal functional operation of the upright extractor 10' has resumed.

Figure 7:
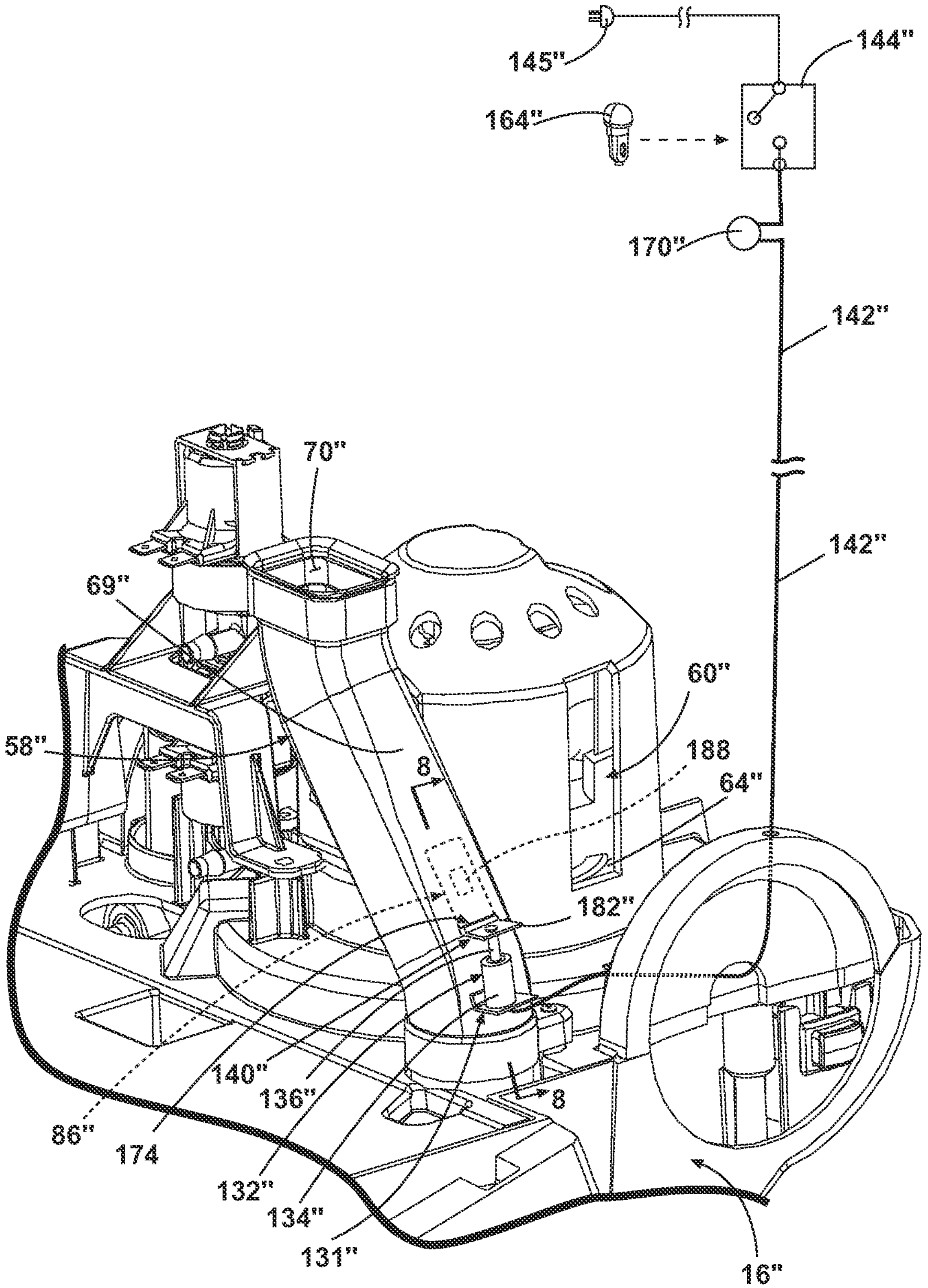
FIG. 7 is a partial perspective view of the foot assembly according to a third aspect of the present disclosure.
Figure 8:
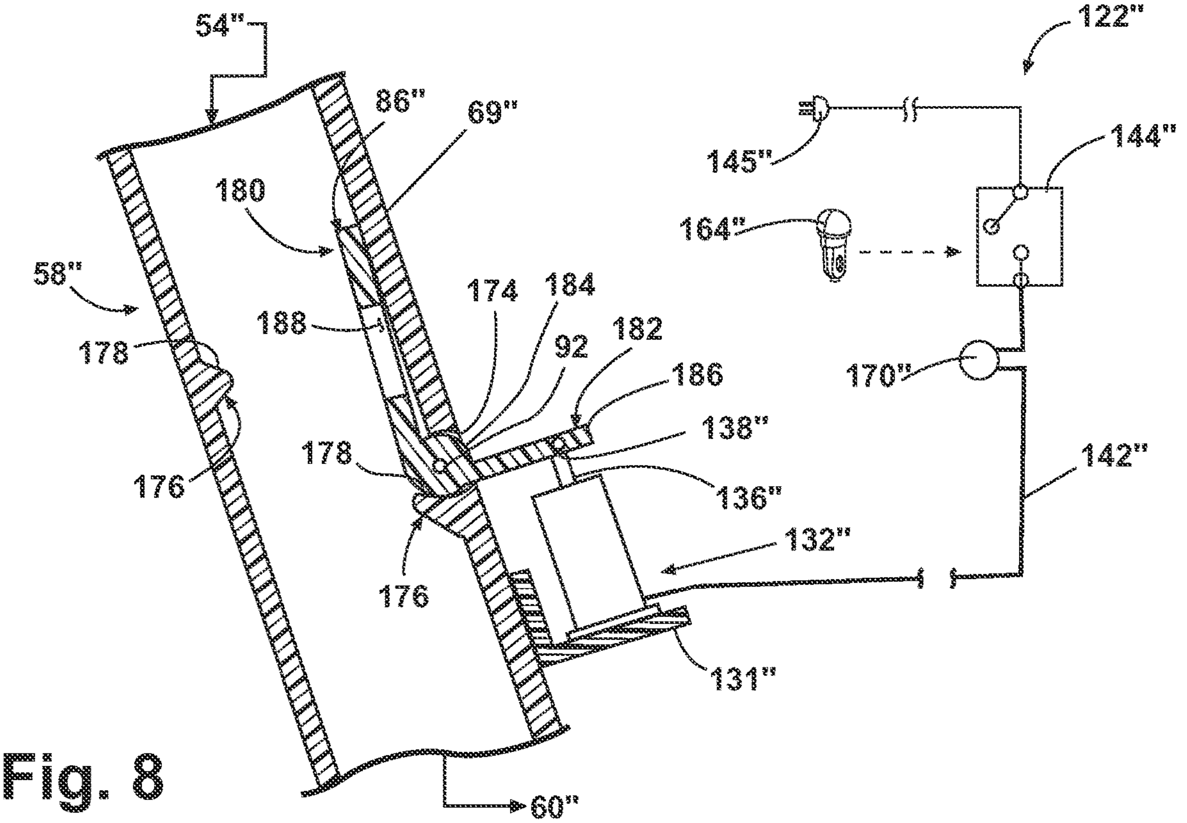
FIG. 8 is a partial sectional view taken along line 8-8 of FIG. 7 showing the duct door in an open position.
Figure 9:
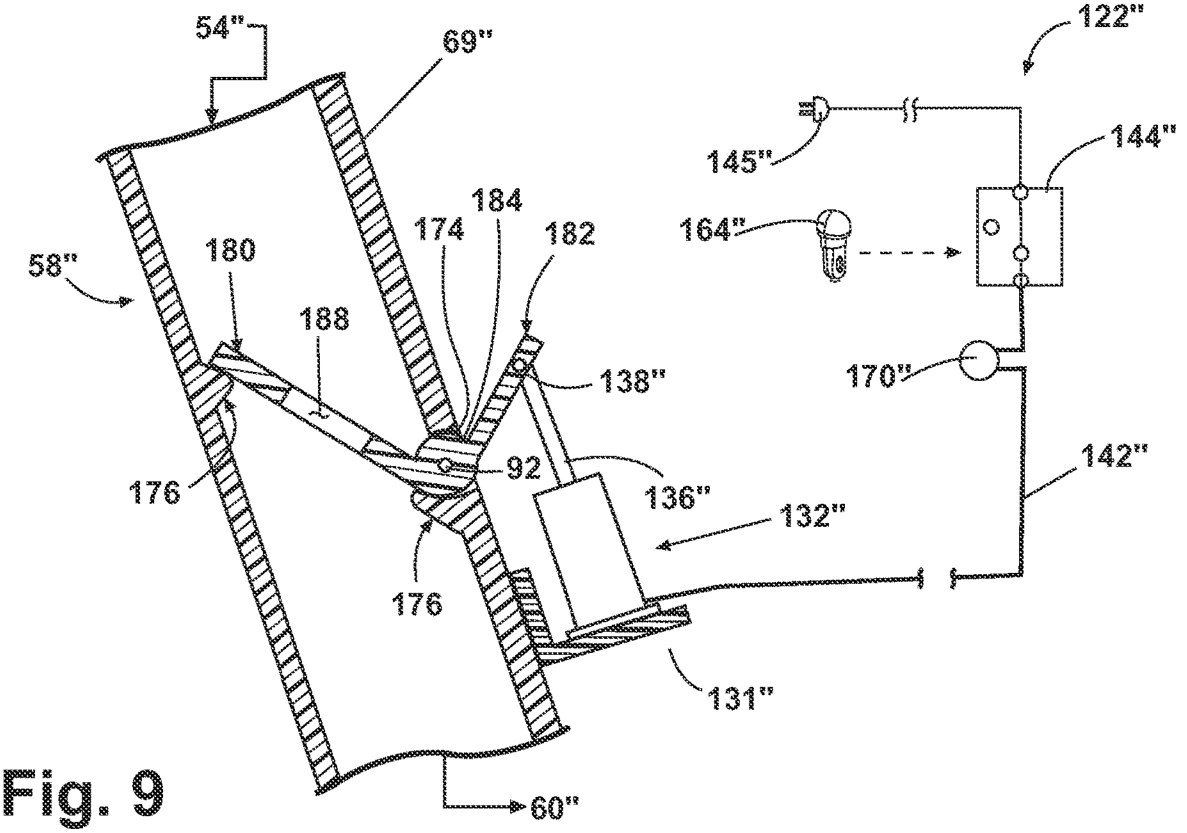
FIG. 9 is a partial sectional view taken along line 8-8 of FIG. 7 showing the duct door in a closed position.

Now referring to FIGS. 7-9, which include a schematic depiction of a third aspect of the present disclosure where like elements from the second example are identified with the same reference numerals and include a double prime (") symbol, the motor duct 58" forms a portion of the working air conduit between the recovery tank outlet 54" and the motor and fan assembly 60" inlet. The motor duct 58" includes a rectangular slot 174 in the outboard planar side 69" and mounting ears (not shown) formed inside the slot 174 pivotally receive bearing pins 92" that extend from an inwardly pivoting duct door 86". The motor duct 58" further includes at least one sealing lip 176 protruding from the inner surface of the motor duct along a generally horizontal reference plane. The sealing lip 176 can also be formed along an inclined or declined plane depending on various design constraints. The sealing lip 176 includes an upwardly facing flat sealing surface 178 configured to selectively seal against the bottom of the inwardly pivoting duct door 86". Two sealing lips 176 have been illustrated in FIGS. 8 and 9.

The inwardly pivoting duct door 86" includes a generally L-shaped member having an inner leg 180 and an outer leg 182 that are connected at a pivot portion 184. Bearing pins 92"extend outwardly from the pivot portion 184 along the pivot axis. The inner leg 180 is configured to be pivotally mounted within the motor duct 58" while the outer leg 182 is configured to remain outside the motor duct 58". A distal end 186 of the outer leg 182 is operably connected to an actuator 122" via either a mechanical or electrical connector as previously disclosed. The inner leg 180 further includes a small restriction orifice 188 having an open area less than any portion of the upstream working air conduit, including the motor duct inlet 70". The inwardly pivoting duct door 86" is configured to pivot between an "open"position where the inner leg 180 is parallel to the outboard planar side 69" of the motor duct 58"and a "closed" position where the inner leg 180 is rotated inwardly to span across the motor duct 58" interior.

When the inner leg 180 is in the "open" position, the motor duct 58" and, thus, the working air conduit are unobstructed. When the inner leg 180 is in the "closed" position, the motor duct 58" and working air conduit are partially obstructed by the inwardly pivoting duct door 86". When the inner leg 180 is in the "closed" position, the working airflow may only flow through the restriction orifice 188, which significantly reduces the working airflow within the working air conduit. In turn, the restriction orifice 188 reduces the working airflow into the motor and fan assembly 60" and this results in a reduced suction upstream of the restriction orifice 188. Accordingly, when the inner leg 180 is in the "closed" position, the floor nozzle inlet 41" adjacent to the cleaning surface also has reduced suction.

The distal end 186 of the outer leg 182 can be operably connected to an actuator 122"via an electrical or mechanical connector as described in previous examples. The electrical connector will be described herein, although a mechanical connector as previously disclosed is also contemplated. In the electrical connector, a conventional solenoid piston 132" operably connects the distal end 186 of the outer leg 182 to the actuator 122" for pivoting the duct door 86" between the "open" and "closed" positions. The solenoid piston 132" has been previously described and includes a cylindrical piston 136" that is selectively movable between a vertically extended position when the solenoid piston 132" is energized (FIG. 9) and a retracted position when the solenoid piston 132" is de-energized (FIG. 8). Electrical conductor leads 142" extend from the solenoid piston 132", through the base assembly 16", through the upright handle assembly 14", and are connected to the actuator 122" as previously described. The actuator 122"includes a momentary micro-switch 144" housed within the upright handle grip 146" and connected to a line power source 145" to selectively energize the solenoid piston 132". A push button 164" is slidably mounted on the handle grip 146" and is operatively coupled to the momentary micro-switch 144" such that the switch becomes selectively engaged when a user slidably engages the push button 164". An optional indicator light 170" can also be included in the circuit as previously described. The indicator light 170" is preferably mounted to the upper portion of the handle 14" and positioned to be easily viewed by a user.

While the restriction orifice 188 has been illustrated as being located on a pivoting duct door 86" mounted within the motor duct 58", it is contemplated that the restriction orifice 188 can be positioned anywhere within the working air conduit and can be incorporated on a slidably mounted duct door, for example. Further, although the restriction orifice has been illustrated as a single orifice it has been contemplated that multiple restriction orifices could be used so long as the combined area of the restriction orifices have a combined open area less than any portion of the upstream working air conduit, including the motor duct inlet 70".

In operation, when extensively soiled areas are encountered and a user desires to pre-treat a heavily soiled area by increasing solution dwell time, a user depresses the push button 164", which actuates the momentary micro-switch 144", selectively interrupting the suction by partially obstructing the suction between the recovery zone and the suction source or between the surface and the suction source. For example, the momentary micro-switch 144" closes the circuit containing the solenoid piston 132" and indicator light 170", thereby energizing both components simultaneously. When energized, the solenoid piston 132" extends and the leading end 138" of the cylindrical piston 136" pushes the distal end 186 of the outer leg 182 upward causing the inner leg 180 of the duct door 86" to pivot inwardly to a "closed" position.

In the "closed" position, the inner leg 180 of the inwardly pivoting duct door 86"spans across the motor duct 58" interior, the bottom perimeter surface of the inner leg 180 rests on the sealing lip 176, and the restriction orifice 188 restricts the working airflow within the working air conduit. While in the "closed" position, suction in the working air conduit upstream from the restriction is significantly reduced. The reduced suction permits the cleaning solution to dwell on the cleaning surface instead of being extracted through the floor nozzle 42". The indicator light 170" illuminates when the suction at the floor nozzle 42" has been restricted. Upon treating the surface sufficiently, the user releases the push button 164", the momentary micro-switch 144" returns to its normally open position thereby opening the circuit and de-energizing both the solenoid piston 132" and indicator light 170". The solenoid piston 132"retracts to its compressed position and pulls the distal end 186 of the outer leg 182 downward returning the duct door 86" to its "open" position where the inner leg 180, including the restriction orifice 188 is rotated upward such that it is parallel to the outboard planar side 69" of the motor duct 58". Thus, the restriction is removed and full suction to the floor nozzle 42" is restored. The indicator light 170" simultaneously shuts off to indicate that suction to the floor nozzle 42" has been restored.

Figure 10:
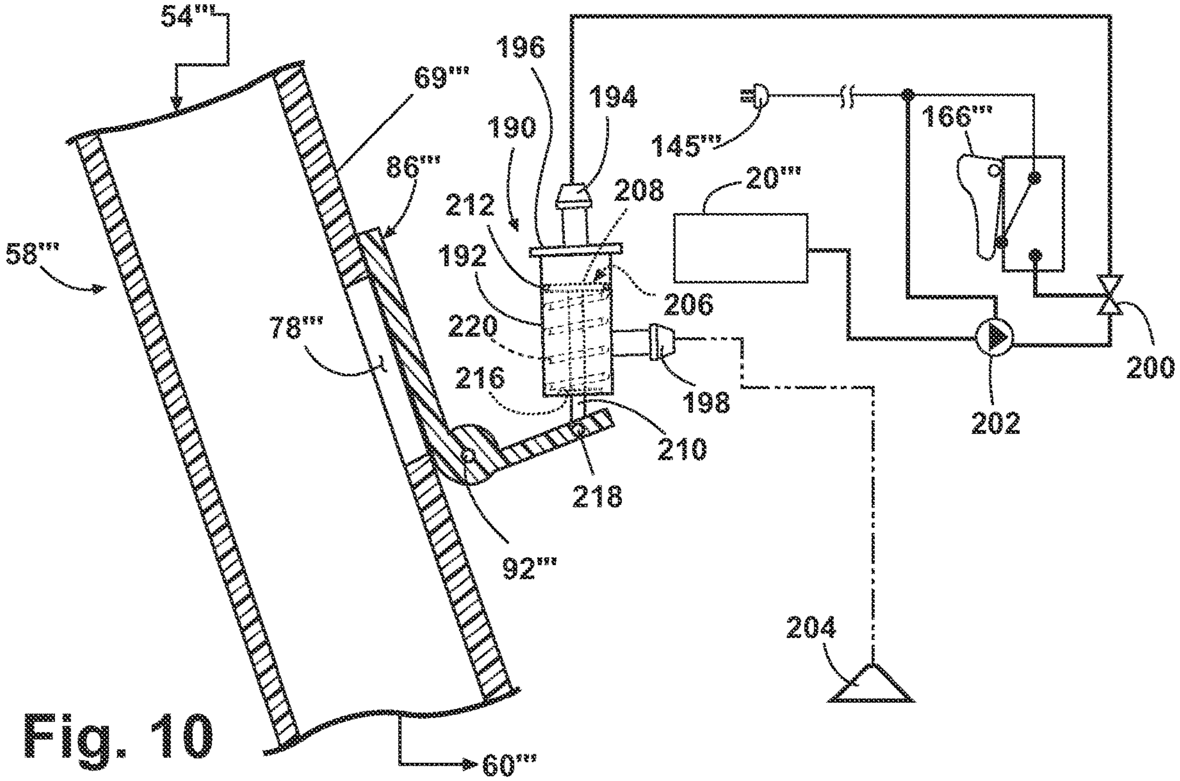
FIG. 10 is a partial sectional view according to a fourth aspect of the present disclosure.
Figure 11:
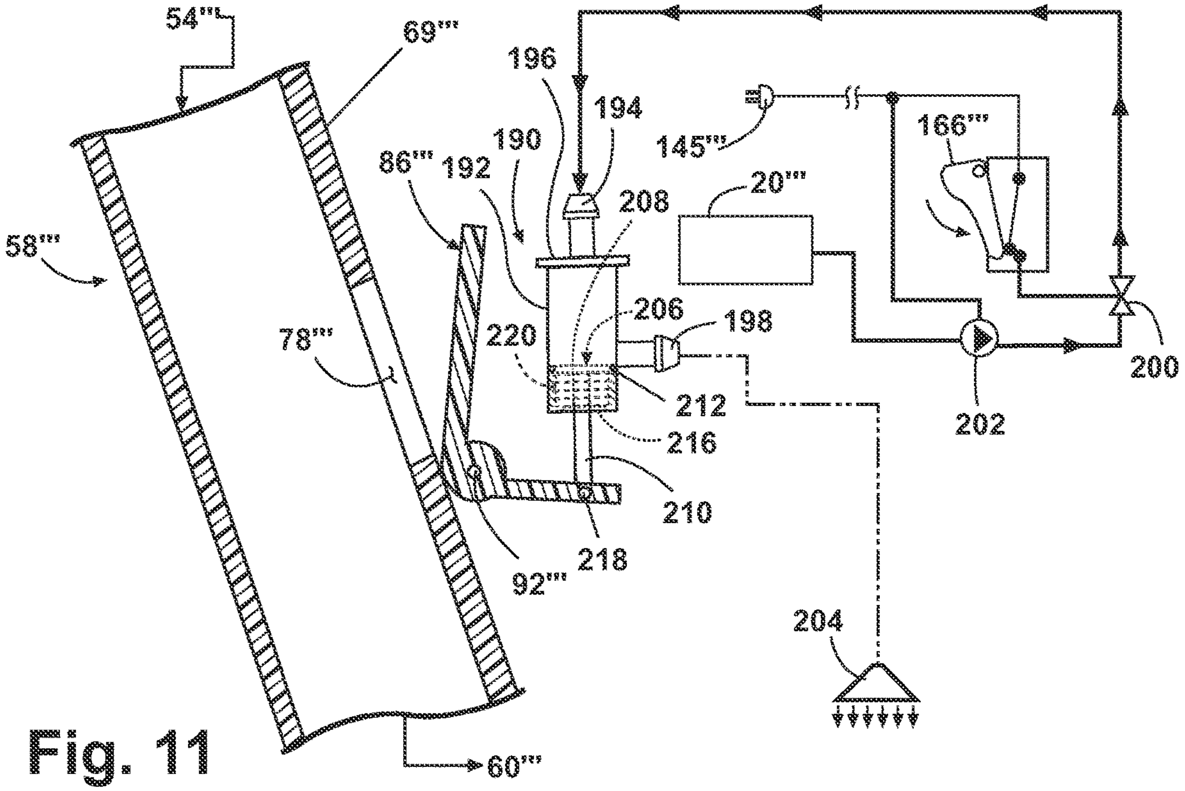
FIG. 11 is a partial sectional view also according to the fourth aspect of the present disclosure.

Now referring to FIGS. 10 and 11, which show a partial depiction of a fourth aspect of the present disclosure where like elements from previous examples are identified with the same reference numerals and include a triple prime (''') symbol. Here, the duct door 86''' is operably connected to the fluid delivery system via a hydraulic connector such that when fluid is applied to the cleaning surface via the fluid distributor, the hydraulic connector moves the duct door 86'''to interrupt suction at the floor nozzle inlet (not shown). The hydraulic connector includes a hydraulic cylinder 190 that includes a cylindrical barrel 192 having an axial inlet port 194 on a proximal end 196 and an outlet port 198 extending radially from a distal end of the barrel 192. The inlet port 194 is fluidly connected to the fluid supply tank 20''' via conventional tubing and fluid fittings. A valve 200 and an optional pump assembly 202 are positioned between the fluid supply tank 20''' and the inlet port 194 for selectively controlling fluid delivery into the hydraulic cylinder 190. The outlet port 198 is fluidly connected to the fluid distributor, which can include one or more spray nozzles 204. The valve 200, located between the pump 202 and the hydraulic cylinder 190, is operably connected to the trigger 166''' that is pivotally mounted within the handle grip 146''' for manipulation by a user. The trigger 166''' is configured to selectively engage the valve 200 via conventional mechanical means such as a piston rod, or conventional electrical means such as a micro-switch and conductor wires, for example.

A plunger piston 206 is configured to slide axially within the barrel 192 between an open and closed position. The plunger piston 206 includes a cylindrical plunger head 208 connected to a proximal end of a piston rod 210. The perimeter of the plunger head 208 is surrounded by an annular seal 212 that is configured to seal against the interior surface of the barrel 192 to prevent fluid leakage there between. A distal end of the piston rod 210 is slidingly supported by an internal bearing 216 mounted at the distal end of the barrel 192. The distal end of the piston rod further includes an eye 218 that is adapted for connection to the duct door 86'''. An optional compression spring 220 is seated between the backside of the plunger head 208 and the distal end of the barrel 192 to bias the plunger piston 206 towards the inlet port 194 in its closed position. In the closed position, the spring 220 forces the plunger head 208 towards the inlet port 194, thereby blocking the fluid flow path to the outlet port 198 and retracting the piston rod 210 within the barrel 192. In the open position, the plunger head 208 is pushed towards the distal end of the barrel 192, thereby opening the fluid flow path between the inlet and outlet ports 194, 198 and extending the piston rod 210 so the distal end protrudes outwardly from the barrel 192. As previously described, the duct door 86''' is configured to open, which creates an air leak through the leak hole 78''' within the working air conduit, or to close wherein the leak hole 78'''is covered. Further, similar to the disclosure above, it has also been contemplated that the duct door 86''' can be operably connected to the distal end of the piston rod 210 in such a way that the duct door 86''' creates a restriction upstream from the vacuum motor/fan assembly 60'''.

In operation, the upright extractor 10''' is prepared for use by filling the solution supply tank assembly 20''' and energizing the unit as previously described. Power is subsequently delivered to the vacuum motor/fan assembly 60''' and fluid pump 202, thereby drawing a vacuum on the fluid recovery system and pressurizing cleaning fluid within the fluid delivery system. A user depresses the trigger 166''' on the handle grip 146''' to dispense cleaning fluid or to dispense additional cleaning fluid onto the cleaning surface. The trigger 166'''actuates the valve 200 downstream from the fluid pump 202. When the valve 200 is opened, fluid flows through the valve 200 and into the inlet port 194 of the hydraulic cylinder 190. The fluid contacts the plunger head 208 and pushes the plunger piston 206 away from the inlet port 194 and compresses the spring 220 seated behind the plunger head 208. The plunger head 208 is eventually forced past the outlet port 198, thus opening the fluid flow path between the inlet port 194 and the outlet port 198 and allowing fluid to flow freely there through. The fluid then flows into the fluid distributor where it is then delivered to the cleaning surface through one or more spray nozzles 204. As the plunger piston 206 is forced towards the distal end of the barrel 192, the piston rod 210 slides axially through the internal bearing 216 and protrudes outwardly from the distal end of the barrel 192. The distal end of the piston rod 210 containing the eye 218 moves the duct door 86''' to create either an air leak or restriction within the working air conduit upstream of the vacuum motor/fan assembly 60 as previously described. The eye 218 moves the duct door 86''' to create an air leak in FIG. 11. Accordingly, suction upstream from the vacuum motor/fan assembly 60''', including suction at the floor nozzle inlet 41''' can be interrupted or restricted simultaneously as cleaning liquid is applied, thereby permitting the liquid to dwell on the cleaning surface and enhance cleaning performance.

When the trigger 166''' is released, the valve 200 closes and stops the fluid flow into the inlet port 194 of the hydraulic cylinder 190. The spring 220 behind the plunger head 208 forces the plunger head 208 towards the inlet port 194, thereby blocking the fluid flow path to the outlet port 198 and retracting the piston rod 210 within the barrel 192. The piston rod 210 slides axially through the internal bearing 216 and the eye 218 pulls the duct door 86'''to its closed position restoring airflow in the working air conduit. Accordingly, suction upstream from the vacuum motor/fan assembly 60''', including suction at the floor nozzle inlet 41''' is restored.

While the present disclosure has been specifically described in connection with certain specific embodiments thereof, it is to be understood that this is by way of illustration and not of limitation. For example, the present disclosure has been described with reference to an upright extractor. The present disclosure is equally applicable to a canister extractor has a solution tank, a pump, a suction source and a recovery tank mounted in the canister, a hose extending from the canister, a wand with a handle at one end connected to the hose and a suction nozzle on the other end, and an actuator on the handle. In this embodiment, the opening can be on the wand, the duct door can be slidably mounted on the wand and the actuator can be mounted directly on the door. Thus, reasonable variation and modification are possible within the foregoing description and drawings without departing from the spirit of the invention, which is described in the appended claims.

What is claimed is:

1. An extractor, comprising:

a fluid delivery system including a solution supply tank assembly, a fluid distributor, and a conduit between the solution supply tank assembly and the fluid distributor for depositing fluid onto a surface to be cleaned;

a fluid recovery system including a suction nozzle, a recovery tank assembly, a suction source having a suction inlet fluidly connected to the recovery tank assembly and the suction nozzle through a working air conduit and adapted to draw liquid through the suction nozzle and deposit the liquid in the recovery tank assembly, and having a suction source outlet;

a leak hole in the working air conduit;

at least one moveable body provided with the leak hole, the at least one moveable body operable between a closed position wherein the leak hole is at least partially sealed and an opened position wherein the leak hole includes an open area and a working airflow at the suction nozzle is reduced;

an electrical switch;

a button operably coupled to the electrical switch and operable by a user to selectively open and close the electrical switch; and a solenoid piston electrically coupled to the electrical switch and movable between an extended position when the electrical switch is closed and a retracted position when the electrical switch is open;

wherein the solenoid piston is operably connected to the at least one moveable body such that the at least one moveably body moves to the opened position when the solenoid piston is in the extended position and moves to the closed position when the solenoid piston is in the retracted position.

2. The extractor of claim 1, wherein the working airflow at the suction nozzle is reduced at least fifty percent.

3. The extractor of claim 1, further comprising an indicator to alert a user when the at least one moveable body is in the opened position.

4. The extractor of claim 3, wherein the indicator provides at least one of a visual signal and an audible signal.

5. The extractor of claim 1, wherein:

the at least one moveable body is a duct door moveably connected to the working air conduit and having a free end with an angled flange; and the solenoid piston acts against the angled flange to move the duct door from the closed position to the opened position.

6. The extractor of claim 1, further comprising:

an indicator light illuminable to alert a user when the at least one moveable body is in the opened position; and wherein the indicator light is electrically coupled to the electrical switch and illuminates simultaneously with movement of the solenoid piston.

7. The extractor of claim 1, further comprising:

a spring configured to bias the at least one moveable body to the closed position.

8. The extractor of claim 7, wherein:

the at least one moveable body is a duct door moveably connected to the working air conduit and at least partially covering the leak hole in the closed position; and the spring is a leaf spring having a secured end fastened to the working air conduit and an unsecured end configured to bias the duct door to the closed position.

9. The extractor of claim 1, wherein:

the at least one moveable body is a duct door moveably connected to the working air conduit and at least partially covering the leak hole in the closed position; and the duct door comprises a generally planar member having a resilient seal affixed along a perimeter to fluidly seal the leak hole when the duct door is in the closed position.

10. The extractor of claim 9, wherein the at least one moveable body and the leak hole are located downstream of the recovery tank assembly.

11. The extractor of claim 1, wherein:

the extractor is an upright extractor including a foot assembly for movement along the surface to be cleaned and a handle assembly pivotally mounted to the foot assembly for directing the foot assembly along the surface to be cleaned.

12. The extractor of claim 11, wherein the button is at least partially located on the handle assembly and the suction source is mounted in the foot assembly.

13. An extractor, comprising:

a fluid delivery system including a solution supply tank assembly, a fluid distributor, and a conduit between the solution supply tank assembly and the fluid distributor for depositing fluid onto a surface to be cleaned;

a fluid recovery system including a suction nozzle, a recovery tank assembly, a suction source having a suction inlet fluidly connected to the recovery tank assembly and the suction nozzle through a working air conduit and adapted to draw liquid through the suction nozzle and deposit the liquid in the recovery tank assembly, and having a suction source outlet;

a moveable body including a restriction orifice having an open area less than that of every portion of the working air conduit upstream of the moveable body and operable between a closed position wherein the moveable body at least partially obstructs the working air conduit and air flow is through the restriction orifice, and an opened position wherein the working air conduit is unobstructed relative to the closed position and a working airflow at the suction nozzle is reduced;

an electrical switch;

a button operably coupled to the electrical switch and operable by a user to selectively open and close the electrical switch; and a solenoid piston electrically coupled to the electrical switch and movable between an extended position when the electrical switch is closed and a retracted position when the electrical switch is open;

wherein the solenoid piston is operably connected to the moveable body such that the moveably body moves to the opened position when the solenoid piston is in the extended position and moves to the closed position when the solenoid piston is in the retracted position.

14. The extractor of claim 13, wherein the restriction orifice is one of multiple restriction orifices having a combined open area less than that of every portion of the working air conduit upstream of the moveable body.

15. The extractor of claim 13, wherein:

the moveable body is a pivoting duct door having an inner leg and an outer leg;

the outer leg is connected to the inner leg at a pivot portion at which the duct door pivots;

the inner leg is disposed within the working air conduit; and the outer leg extends through a slot in the working air conduit and is moveable to pivot the duct door between the opened position and the closed position.

* * * * *